3,387,915
COMPOSITIONS AND METHODS FOR PRODUCTION OF COLORED GLASS FIBERS
Nathaniel Willis, Chicago, Ill., assignor, by mesne assignments, to Dow Corning Corporation, Midland, Mich., a corporation of Michigan
No Drawing. Filed Oct. 1, 1962, Ser. No. 227,554
3 Claims. (Cl. 8—55)

This invention relates to compositions and methods for the production of colored glass fibers and fabrics.

Because of its relatively inert nature which gives it long life and good washability, glass in the form of cloth has achieved widespread usage. However, its applications have been somewhat restricted because its inertness has also made it quite resistant to standard dyes and dyeing techniques. In many cases these produce only pastel shades so that much of the glass cloth market is served only by undyed glass or by lightly colored fabrics.

Accordingly, it is an object of this invention to provide improved glass fibers and fabrics by providing both compositions and processes for coloring glass fibers and glass cloth.

These and related objects are accomplished by this invention in which the color receptivity and retentivity of glass fiber and glass fabric are improved by applying to the glass the reaction product of ammonia and a mixture of from about 20 to about 80 molar percent of a halosilane having the formula $R_2SiHal_2$ and the balance of said mixture being a halosilane having the formula $RSiHal_3$ in which formulae Hal is a member of the halogen group and R is a member of the group consisting of hydrogen, lower alkyl, lower alkenyl and aryl. In some instances this reaction product is applied to the glass fabric in advance of the dye application and in other cases the reaction product may be applied at the time of the dyeing process as will be explained later.

Processes for ammonolysis of halosilanes are set forth in various patents such as U.S. 2,462,635 to Haber and U.S. Patent 2,579,417 and 2,579,418, both to Cheronis. Ammonolysis is conducted at temperatures near 0° C. in the absence of water and in the presence of an inert solvent such as methylene chloride, the ammonia becoming an amino substituent replacing one or more of the halogen substituents on the silicon atom of the halosilane.

By ammonolysis of such a mixture of halosilanes a variety of reaction products are possible but all can be categorized as silazanes. With a trihalosilane, ammonolysis is presumed to favor the formation of a silazane containing structures crosslinked at the silicon atoms through the amine substituent while the ammonolysis of a dihalosilane is believed to tend toward the development of cyclics containing alternating silicon-nitrogen linkages. Accordingly, beginning with a mixture of the di- and trihalosilanes these reactions plus other further reactions between the otherwise separate products yield resinous polymers which are essentially but not precisely reproducible but which do have in common the repeating silicon-nitrogen linkages.

Halosilanes to be preferred for the practice of this invention are the chlorosilanes, these being the least expensive and therefore most readily available. In general, the dichlorosilanes upon being ammonolyzed yield polymeric reaction products with the characteristics of an oily liquid, these products being very stable at room temperature and above, due at least in part to the difunctionality established in the original silane by the two chlorine substituents and retained in the form of amine substituents following ammonolysis. Conversely, many of the trihalosilanes have a functionality when ammonolyzed that is so high as to produce very viscous polymers in both liquid and solid forms even at room temperature.

A silazane reaction product with a functionality below about 2.2 (about 80 percent difunctional silazane based on the original dichlorosilane) will be too non-reactive in the applications to be described. Above a functionality of about 2.8 (about 80 percent trifunctional silazane based on the original trichlorosilane) the silazane reaction product will be so reactive as to react with itself and be either solid or so viscous as to be relatively insoluble and therefore unmanageable and unreactive in the manner required for the purposes of this invention. Therefore, mixtures of both di- and trichlorosilanes are the contemplated starting material for ammonolysis to produce the reaction products to be used in the practice of the invention.

Ammonolysis of a mixture is carried out at reduced temperatures in the same manner as ammonolysis of a single halosilane using either liquid or gaseous ammonia according to methods set forth in the aforementioned patents.

The following description and examples further illustrate procedures and reaction products having application for the purposes of this invention.

Example I

Into a dry reactor 230 pounds of methylene chloride are introduced as solvent for 13.5 pounds of methyltrichlorosilane and 2.9 pounds of dimethyldichlorosilane, this constituting a mixture of the two halosilanes in a molar ratio of 4 to 1, respectively. The reactor is closed, swept with nitrogen and the contents cooled to 0° C. before introducing gaseous ammonia below the liquid surface. Nine pounds of ammonia are added continuously for 98 minutes, the temperature rising during the reaction and then falling, as the end point approaches. The mixture is heated to 25° C., filtered to remove the by-product ammonium chloride, and the solvent is then removed by distillation. Analysis of the product showed 21.72% C, 8.01% H, 27.40% N, 40.80% Si, 0.08% Cl, the product being yellow-white crystals.

Example II

Using the same ingredients in an equimolar mixture and the same method as set forth in Example I produced a clear, faintly yellow, low viscosity liquid; $d$ 1.070 and $n_D^{25}$ 1.4897.

Example III

Seven molar parts of vinyltrichlorosilane and five molar parts of methylphenyldichlorsilane reacted with gaseous ammonia in the manner of Example I yielded a light yellow liquid with viscosity greater than Z–6; $d$ 1.176 and $n_D^{25}$ 1.5756.

Example IV

Equimolar amounts of the ingredients in Example III reacted in the same manner with ammonia produced a very viscous haze yellow liquid with $d$ 1.143 and $n_D^{25}$ 1.5782 and the same ingredients in molar ratios of 5 to 6, respectively, when subjected to ammonolysis gave a cloudy liquid having a viscosity of Z–6, $n_D^{25}$ 1.5722, $d$ 1.136.

Example V

Four molar parts of ethyltrichlorosilane and 1 molar part of dimethyldichlorosilane when ammonolyzed according to the foregoing procedure produced a viscous, opaque liquid, $d$ 1.110 and $n_D^{25}$ 1.5081.

Example VI

Equimolar portions of allyltrichlorosilane and dimethyldichlorosilane upon ammonolysis gave a light but cloudy liquid with $d$ 1.043 and $n_D^{25}$ 1.5021.

Other specific formulations made for use in the practice of this invention included dimethyldichlorosilane and vinyltrichlorosilane in molar ratios of the two constituents of 1 to 2 and 3 to 5, respectively, and methyltrichlorosilane in equimolar mixes with either diphenyldichlorosilane, methylvinyldichlorosilane or methyldichlorosilane. Vinyltrichlorosilane was combined with methylvinyldichlorosilane as well as with diphenyldichlorosilane, both combinations being in molar ratios of 5 mols of vinyltrichlorosilane to 6 mols of each of the other constituents. Trichlorosilane in equimolar proportions with either methyldichlorosilane or dimethyldichlorosilane was also subjected to ammonolysis. In the same equimolar proportions phenyltrichlorosilane was mixed with either dimethyldichlorosilane or diphenyldichlorosilane and ammonolyzed.

The following examples provide detailed description of a process for coloring glass, a composition for coloring glass and the resulting color receptive and color retentive glass fabric, all of which constitute the essential teachings of this invention applicable either to glass fibers or to glass fabrics and all of which involve the use of the above-described silazane reaction products and various dyes and pigments.

Example VII

An equal parts solution of acetone and toluene containing 2% of Cibacette Rubine BS, disperse red No. 13, metanitroaniline "azo" dye by Ciba Co., Inc. for tinting acetate fibers (C.I. 11115) and 2% of the methylphenyl-vinyl silazane copolymer of Example III was prepared. Into this, heat-cleaned glass cloth specimens were dipped for 10, 20 or 30 seconds. The 20 second dipped cloths were rinsed with water immediately after dipping, the 10 and 30 second dipped specimens not being rinsed in any case. A representative of each of the three dips was dried at room temperature and another representative of each was force dried by heating overnight at 140° F. After allowing an additional 72 hours at room conditions, the specimens were boiled for 15 minutes in a 1% "Tide" in water solution ("Tide" in Procter and Gamble's synthetic anionic, general purpose detergent comprising the sodium salts of alkyl aryl sulfonates such as dodecyl and tridecyl benzene sulfonates), this being an accelerated washability test designed to separate those systems that show utility from those with little or no color fastness. The intensity of the dye color remaining on the cloth was used as an index of the effectiveness of the particular fixative, a very deep color being rated excellent, a deep color considered good and a light color somewhat deeper than pastel evaluated as fair, and pastel or lighter rated poor.

Even in the case of the 20 second dip specimens which were rinsed immediately after dipping the final effect after drying (either at room temperature of at 140° F. overnight) was rated as better than good although just a measure less than excellent, all of the other specimens receiving an excellent rating.

Example VIII

As control panels for purposes of comparison in the processes of Example VII, identical specimens of glass cloth were treated using an amino-functional silane containing primary and secondary amine groups available from Dow Corning Corporation and having commercial application as a dye fixative in a water system. In all cases of 10, 20 or 30 second dipped samples the results were rated as being poor with the 20 second, rinsed specimens being considered less than poor because there was very little, if any, color effect produced.

Example IX

The same results as were obtained in Example VIII with the 20 second, rinsed specimens (less than poor) were obtained in all cases (10, 20 or 30 seconds dip) with glass cloth using the same procedures but using no fixative of any sort to provide an additional basis for comparison.

Example X

The resinous composition resulting from ammonolysis of a mix or blend of methylphenyldichlorosilane and vinyltrichlorosilane with a molar ratio of 6 to 5, respectively, performed in an apparently identical manner as did the equimolar mix of the two silazanes described in the foregoing examples.

Example XI

Again, using the solution of 2% Cibacette Rubine BS described in Example VII and substituting 2% of ammonolyzed methylvinyldichlorosilane and vinyltrichlorosilane in a solution with molar ratio of 6 to 5, respectively, for the copolymer silazane employed in Example VII, somewhat lesser dye intensities were produced in glass cloth rated as better than good but not excellent. The 20 second dip and rinse treatment of the glass cloth lowered the rating to fair, the color being deeper than pastel, it being understood that in this example and in all other examples ratings were arrived at following in sequence (a) a drying period either at room temperature or at 140° F., (b) a 72-hour period at room conditions, and (c) a 15-minute period in boiling "Tide" solution.

The results just described for Cibacette Rubine BS giving a red color were duplicated for Cibacette Yellow 2G Extra, disperse yellow No. 5, a para-nitroaniline "azo" dye (C.I. 12790) and Cibacette Brilliant Blue BG, disperse blue No. 3, an anthraquinone dye (C.I. 61505), both being other acetate dyes by Ciba Co., Inc., which gave deep colors to glass swatches. However, other types of dyes are similarly effective in producing good color intensity in cloth. In particular, superior results were obtained with basic dyes such as Calcozine Red BX (C.I. 45170) made by American Cyanamid Company and Rhodamine 6GDN by National Aniline (C.I. 45160).

Example XII

Swatches of heat-cleaned glass cloth were treated for 30 seconds with 1% Calcozine Red BX in aqueous solution and methylphenyl-vinyl (molar ratio 6 to 5) substituted copolymer silazane, 1%, in a 50:50 acetone-water solution, the process being the same as in previous examples for dyeing, drying and testing by washing. Color intensity was excellent, and far surpassed that resulting from the same treatment using the amino-functional silane mentioned in Example VIII in acetone-water solution.

To illustrate another alternative method of handling the dyeing process in which the silazane copolymers and dye are applied separately in many cases is an equally effective process is shown in the following examples:

Example XIII

Heat-cleaned glass cloth was pretreated by dipping into an acetone-toluene solution of the same silazane (1% of the silazane in 50:50 acetone-toluene) used in Example XII. It was then dried at room temperature and dipped into the same 1% Calcozine Red BX aqueous solution used there. The result was very comparable but not quite equal to the color intensity developed in Example VIII. However, here again the result was greatly superior to the effect where the same process was followed using the amino-functional silane fixative of Example VIII which, in turn, was better than the result of the same steps applied to cloth not treated in any manner before dip dyeing.

Example XIV

Rhodamine 6GDN with the same procedures employed in Examples XII and XIII produced effects with the same ratings for the Calcozine Red BX.

Example XV

Cibanone Red 4B Micro PDR, vat red No. 24, available from Ciba Co., Inc. was dissolved to make a 1% by weight solution in water and to a 100 parts by weight of solution were added 3.1 parts by weight each of sodium hydroxide and sodium hyposulfite. Following the procedures set forth above for applying the silazane copolymer to the cloth in a pretreatment and drying before applying the dye produces cloths which were intensely colored with the cloth force dried at 60° C. overnight possibly producing even a slightly more intense color than the samples which were dried at room temperature.

Pigment dispersions were also considered to determine their efficacy and applicability in coloring glass. By gradually diluting the pigment presscake with distilled water and stirring after each addition to minimize the size of pigment agglomerate, good dispersions were obtained and maintained by the addition of a small amount of wetting agent. Glass cloth test specimens were heat cleaned and processed as indicated with the methylphenyl-vinyl silazane copolymers and various pigments illustrated by the following:

Example XVI

An organic phthalocyanine pigment producing a blue color was dispersed as a 2.5% aqueous suspension and used to color glass cloth treated with a 2% solution of the methylphenyl-vinyl silazane copolymer in methylene chloride. After drying, the swatches were dip dyed for 30 seconds in the SXN Blue 2G solution and dried again at 200° C. for 5 minutes. Excellent deep blue color was obtained which remained apparently unaffected by a 15 minute boil. Control samples given no pretreatment with the silazane copolymer or other fixative retained little, if any, color and those treated with the commerically employed amino-functional silane fixative referred to in Example VIII were not as intensely colored as the silazane treated ones.

Example XVII

A preliminary treatment of glass cloths with a 2% solution of an equimolar mix of the methylphenyl-vinyl silazane copolymer in methylene chloride followed by drying and dip dyeing in a 2.4% aqueous dispersion of Indo Brilliant Scarlet Toner R–6500, a light-fast vat pigment by National Aniline (C.I. 71140), gave intensely colored cloths following the washability tests as compared to the controls which showed little color retention.

Example XVIII

A light-fast flavanthrone of the vat classification (C.I. 70600), Indo Yellow Lake Y–5713 from National Aniline produced intensely colored cloths in the manner of those in Example XIV and again the controls retained very little color.

Example XIX

An alpha modification of copper phthalocyanine blue toner, Skyline Blue B–4712 (C.I. 74160) from National Aniline, handled in the same manner with cloths processed in line with Example XIV produced deep colors in the final product whereas the control samples did not retain their color through washing.

EXAMPLE XX

A presscake of a light-fast indanthrene pigment toner, Indo Toner Blue B–79 (C.I. 69810) made by National Aniline was dispersed and employed in the manner of Example XIV to produce intensely colored cloth specimens as compared with the control cloths which lost almost all their color during the wash test.

Example XXI

An iron oxide pigment giving a brown color was dispersed in water and applied to glass cloth treated according to the method of Example XIII to give colors of commensurate intensity.

In summarizing the procedure and results of the immediately preceding examples, higher concentrations of pigments are not necessary and will, in fact, result in the cloth retaining excessive amounts of loose pigment. By keeping solution concentrations of the dyes at approximately 3% this can be practically eliminated. Agitation of the wash solution will, of course, tend to remove such excess also.

Although results vary and modification in method is required according to the particular type of dye being applied, the compositions and methods of the invention are directed to dyes broadly including acid dyes, direct dyes, spirit soluble dyes and premetallized dyes but preferentially to acetate dyes, basic dyes, vat dyes and pigment dyes. In general, when the dyes are to be applied in an aqueous dispersion, the silazane copolymer is applied initially to the cloth and dried before dye application is begun. If organic solvent soluble dyes are applied from such medium, the silazane copolymer will generally better lend itself to a one-step method of application simultaneously with the application of the dye by conventional processes.

Having thus described the invention, what is claimed is:

1. A process of coloring glass fabric which comprises applying the reaction product of ammonia and a mixture of from about 20 to 80 molar percent of a halosilane having the formula $R_2SiHal_2$ and the balance of said mixture being a halosilane having the formula $RSiHal_3$ in which formulae Hal is a member of the halogen group and R is selected from the group consisting of hydrogen, lower alkyl, lower alkenyl and aryl, and a dye to glass fabric.

2. The process of coloring glass fabric of claim 1 in which said reaction product of ammonia and the mixture of halosilanes is applied simultaneously with said dye.

3. The process of coloring glass fabric of claim 1 in which said reaction product of ammonia and the mixture of halosilane is applied and dried before said dye is applied.

References Cited

UNITED STATES PATENTS

| | | | |
|---|---|---|---|
| 2,971,864 | 2/1961 | Speier | 117—124 |
| 2,436,304 | 2/1948 | Johannson | 8—8 |
| 2,579,418 | 4/1953 | Cheronis | 117—135.5 |
| 2,778,746 | 1/1957 | Steinman et al. | 117—76 |
| 2,669,552 | 2/1954 | Seymour | 260—37 |
| 2,623,028 | 12/1952 | Love | 260—37 |
| 2,129,460 | 9/1938 | Bluem et al. | 8—8 |
| 2,951,739 | 9/1960 | Roff | 8—8 |

JULIUS FROME, *Primary Examiner.*

MORRIS LIEBMAN, A. H. WINKELSTEIN, *Examiners.*

A. HOLTZ, G. E. AUVILLE, J. E. CALLAGHAN, L. T. JACOBS, *Assistant Examiners.*